Aug. 15, 1961 M. PROCHÁZKA 2,995,928
INDICATOR OF TORSIONAL OSCILLATIONS

Filed March 28, 1956 3 Sheets-Sheet 1

INVENTOR.
Miroslav Procházka
BY Richard
Agt

Aug. 15, 1961 M. PROCHÁZKA 2,995,928
INDICATOR OF TORSIONAL OSCILLATIONS
Filed March 28, 1956 3 Sheets-Sheet 2

INVENTOR.
Miroslav Procházka
BY Richard
Ag't

Aug. 15, 1961  M. PROCHÁZKA  2,995,928
INDICATOR OF TORSIONAL OSCILLATIONS
Filed March 28, 1956

INVENTOR.
Miroslav Procházka

United States Patent Office 2,995,928
Patented Aug. 15, 1961

2,995,928
INDICATOR OF TORSIONAL OSCILLATIONS
Miroslav Procházka, 21 Tuchomerice, Czechoslovakia
Filed Mar. 28, 1956, Ser. No. 574,513
1 Claim. (Cl. 73—70.1)

The present invention relates to an indicator of torsional oscillations.

Numerous types of indicators of torsional oscillations are known, but none of them is suitable for use when the frequency of torsional oscillations to be measured exceeds 5000 cycles per minute, which is the case with the majority of diesel engines produced at present.

The known indicators do not comply with the high demands placed on their ability to resist mechanical strain. Other indicators, again, are bulky, and their manufacture is difficult and costly.

It is the main object of the present inveniton to provide an indicator of torsional oscillations of a rotating body suitable for use in cases where the known devices fail or cannot be used at all, in particular for higher frequencies.

A further object of the invention is to provide an indicator of torsional oscillations which is insensitive to unfavourable influences occurring in the course of measurements on an engine, in particular to translation vibrations, even if the receiving coil of the indicator is set into oscillation by such vibrations.

It is another object of the invention to provide an indicator of torsional oscillations capable of resisting mechanical stresses, so as to withstand the considerable strain caused by the rotation and translation vibrations, which invariably occur in the course of the measurement of torsional oscillations on an engine.

A further object of the invention is to provide an indicator of torsional oscillations which is insensitive to the penetration of oil into the mechanism and to high temperatures, which is of compact design and may therefore be used with preference in instances where the available space is limited, e.g. for testing aircraft engines, where the indicator has to be placed between the protruding end of the crankshaft and the propeller.

According to the invention the indicator of torsional oscillations comprises coils, adapted to receive and measure the torsional oscillations, said coils moving in a magnetic field and either themselves forming a seismic mass or directly housing the seismic mass.

The accompanying drawings represent by way of example an indicator of torsional oscillations according to the present invention.

Figure 1:
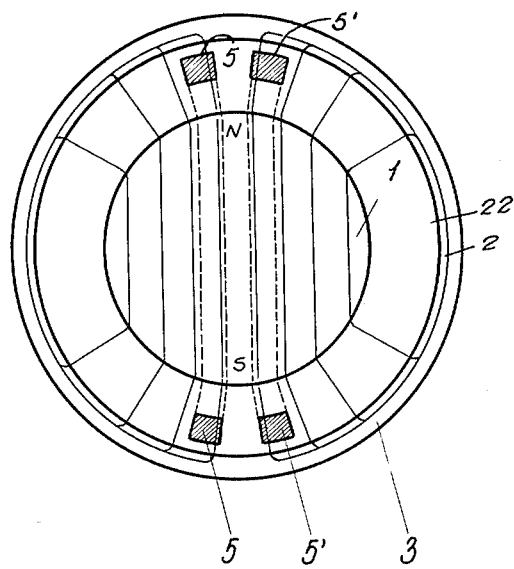
Figure 2:
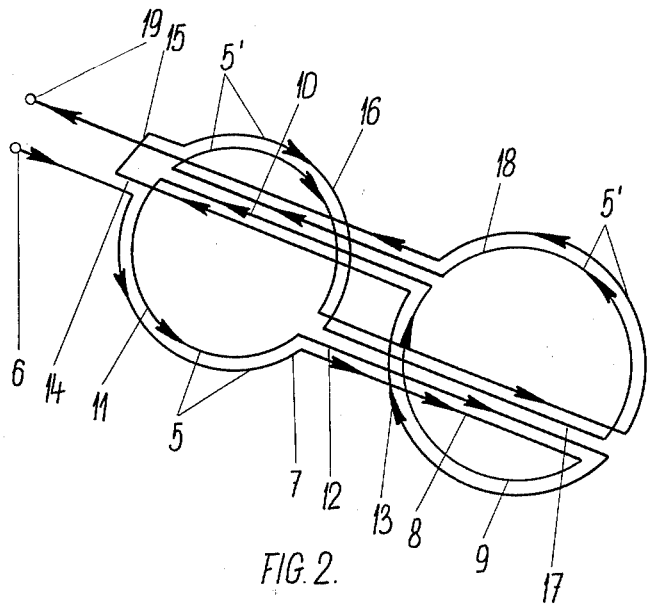
Figure 3:
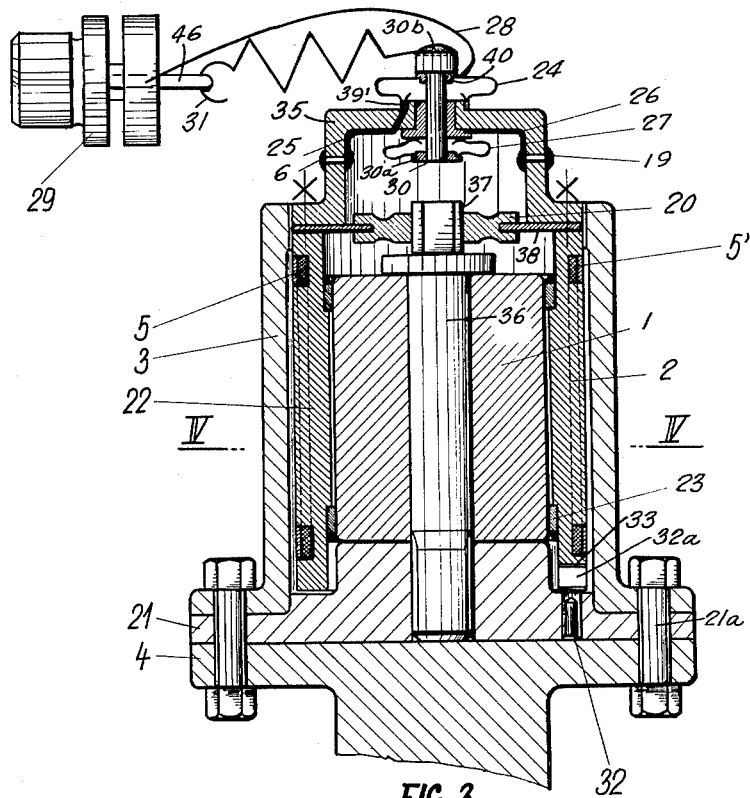
Figure 4:
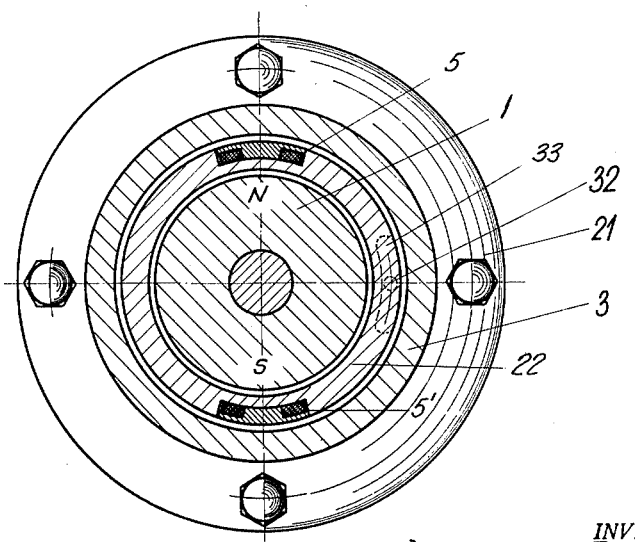
Figure 5:
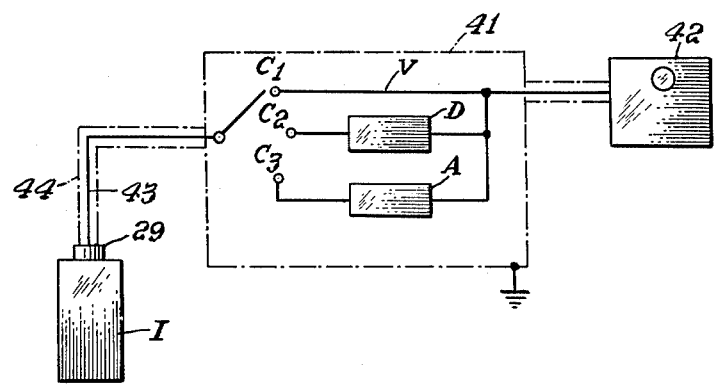
Figure 6:
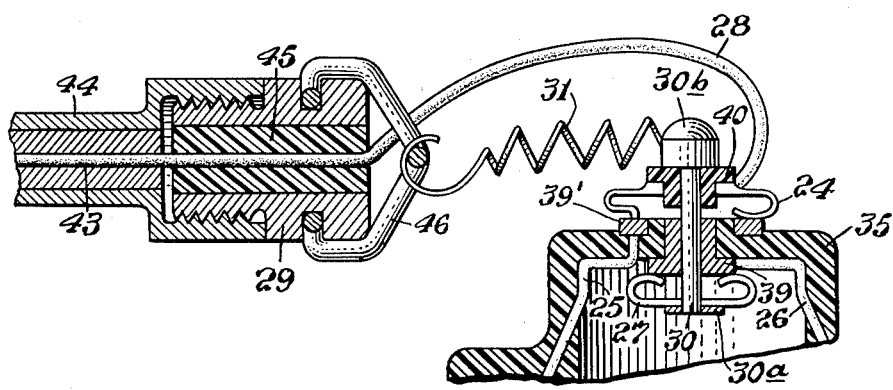

FIG. 1 represents diagrammatically the basic principle of operation of the indicator, FIG. 2 shows in a diagrammatic representation the winding of the coils, FIG. 3 shows the indicator in longitudinal section, FIG. 4 is a cross-sectional view of the indicator along the line IV—IV of FIG. 3, FIG. 5 is a diagrammatic representation of the indicator associated with measuring and recording means, and FIG. 6 is a sectional view of an element of the apparatus appearing in FIG. 3.

The basic principle of the indicator of torsional oscillations is shown in FIG. 1. The indicator comprises a permanent magnet 1, magnetized in the lateral direction, that is, magnetized so that its north and south poles are at diametrically opposed sides of the magnet, and the magnetic circuit proceeds from the magnet 1 through a body 22 of low magnetic permeability, an air gap 2 and a sleeve 3 of soft iron. As seen in FIG. 3, sleeve 3 as well as the magnet are rigidly secured to a revolving shaft 4, the torsional oscillations of which have to be measured. Two coils marked in general 5, 5' are provided in the air gap 2, the coils being wound in a way shown in detail in FIG. 2.

As shown, the winding of one coil 5 on one side of the apparatus proceeds from a terminal 6 to the first half-coil 7 through a connection 8 to the other half-coil 9, which, however, is wound in opposite direction than the half-coil 7, as indicated by arrows. Then, the winding returns through a connection 10 to the first half-coil, proceeds through a further half coil 11, connection 12 to a half coil 13 wound in opposite direction and so on through a plurality of pairs of half-coils arranged in this way and from the last connection 14 through a connecting wire 15 to the other side of the coil, marked in general 5', consisting again of a half-coil 16, connection 17, leading to the other half-coil 18 wound in opposite direction than the half coil 16 and so on, the end of the winding being connected to the second terminal 19. The winding of the coils 5, 5' comprises thus a plurality of pairs of half-coils 5 of opposite directions, connected in series, the end portion of one side being connected to the first winding of the other side, which consists also of a plurality of pairs of half coils 5', wound in opposite direction and connected in series.

The coils 5, 5' themselves form a seismic mass and are adapted to be rotated by a resilient member 20, (FIG. 3), which does not transmit torsional oscillations, so that a relative movement of the coils in the magnetic field takes place. Due to this movement a voltage proportional to the velocity of the torsional oscillations is induced in the coils, said voltage being transmitted over two collectors, and a known integration fourpole to the measuring and recording means.

FIGS. 3 and 4 show details of the indicator embodying this invention, and it will there be seen that the permanent magnet 1 has a central bore receiving a bolt 36 of a material having a low magnetic permeability, for example, duraluminum, and which is screwed into a flange 21 to rigidly connect the magnet 1 to the flange 21. A generally cylindrical body 22 formed of an insulating plastic or other suitable material having low magnetic permeability, for example, of a material available under the trademark "celloron," surrounds the magnet 1, and, while the plastic body 22 does not provide a magnetic path, it nevertheless does not interpose a greater obstacle to the flow of magnetic lines of force than the air gap 2 between the body 22 and the outer shell or sleeve 3 of soft magnetic iron, so that the magnetic circuit proceeds from the magnet 1 through the body 22 and through the air gap and the sleeve 3. The body 22 has suitable grooves formed in the outer surface thereof to receive the coils 5 and 5' which are suitably cemented within the grooves, and bearing rings 23 formed, for example, of bronze, are provided within the plastic body 22 and bear against the outer surface of the magnet 1 to permit relative angular displacement of the body 22 and magnet 1 while serving as an oscillation or shock absorbing means for the apparatus.

The flange 21 having the magnet 1 rigidly connected thereto by the bolt 36 is interposed between the flanged end of the shaft 4 which is subject to torsional oscillation and a flange on the lower end of the outer shell or sleeve 3, and such flanges are all rigidly secured together by bolts 21a, so that the magnet 1 and sleeve 3 will oscillate with the shaft 4. The body 22 is connected to the magnet 1 by way of a resilient connecting ring member 20, for example, of rubber, which is secured, at its inner periphery, to a sleeve 37 mounted on the upper end of bolt 36, and, at its outer periphery, is secured between the upper end of body 22 and a cap 35, also of insulating plastic, secured on the body 22.

The cap 35 carries a collector assembly that includes a central conducting rod 30 extending through a bushing 39 of an electrically conductive material which is centrally carried by the insulating cap 35. The rod 30 has an abutment 30a at its lower end, and a spring element 27 is mounted on the rod 30 between the abutment 30a and the bushing 39 to establish contact between the rod 30 and the bushing 39 and also to yieldably urge the rod 30 in the downward direction. A conductor 26 extends from the bushing 39 to the terminal 19 which is also mounted in the insulating cap 35 and which is connected to the coil 5' by way of a suitable conductor (not shown). The upper end of the rod 30 has a head 30b thereon, and an insulating bushing or ring 40 is mounted on rod 30 below the head 30b. A spring collecting member 24 is mounted between the insulating ring 40 and a conducting ring 39' which is mounted on the cap 35 and insulated from the bushing 39 by the insulating material of the cap 35. It is apparent that the spring collecting member 24 yieldably urges the rod 30 in the upward direction, that is, in the direction opposed to the action of the spring element 27 so that the resilient forces exerted by the members 24 and 27 oppose each other and thereby ensure reliable contact with the ring 39' and the bushing 39, respectively. A conductor 25 extends from the conductive ring 39' to the terminal 6 which is, in turn, connected to the coil 5 by a suitable conductor (not shown).

Referring to FIG. 6, it will be seen that the spring collector 24 is connected, by way of a conductor 28 to the core 43 of a transmission cable having shielding 44. The core 43 of the transmission cable is connected to the wire or conductor 28 within a plug 29 of conductive material, and the core 43 is surrounded by insulating material 45 within the plug 29 which, in turn, is in electrically conductive contact with the shielding 44 of the transmission cable. The head 30b of rod 30 which is in electrical contact with the bushing 39 and the spring element 27 is connected by a spring 31 of electrically conductive material to a yoke 46 having its ends mounted in a radially outward opening groove extending around the circumference of the plug 29.

The spring 31 prevents the rotation of the collector rod 30 and the spring contacts 24 and 27 thereon and at the same time eliminates any dynamic influence of the mass of the plug 29 on the collector. Pins 32 are provided in the flange 21 adapted to move in arcuate slots 33 in lower edge of the body 22. During the starting or stopping period of the shaft 4 the pins 32, cooperating with the slots 33 act as a safety member limiting the maximum relative displacement of the body 22 with respect to the flange 21. Referring now to FIG. 5, it will be seen that the indicator of torsional oscillations embodying the present invention and there generally identified by the letter I has the current pulses generated therein transmitted by way of the plug 29 to the core 43 of the transmission cable which extends to a control box 41. The shielding 44 of the transmission cable is connected to the chassis or casing of the control box 41 which is grounded, as shown. Within the control box 41 there is a three-position switch having contacts $C_1$, $C_2$ and $C_3$ and a movable contact connected to the core 43 of the transmission cable. The contact $C_1$ is connected, by way of a conductor V to an oscillograph 42, while the contact $C_2$ leads to an apparatus D for measuring the amplitude of the indicated oscillations. This apparatus may consist of an integrating network which is well known in the art. Finally, the contact $C_3$ leads to a differential network A which is also of known design and serves for measuring the acceleration.

The fact that, during measurement, the coils 5, 5' together with the body 22, in which they are mounted, themselves form the seismic mass, is of particular advantage, because the relatively delicate winding is not subject to the dynamic stresses or forces produced by the torsional oscillations.

I claim:

In a device for indicating torsional oscillations of a rotated member, the combination of a single cylindrical permanent magnet having the poles thereof disposed at diametrically opposed sides thereof, a magnetic sleeve coaxially surrounding said magnet and spaced radially from the latter to define an annular space therebetween, means for connecting said cylindrical magnet and sleeve to the rotated member coaxially with the latter to rotate therewith so that said magnet produces a rotated magnetic field which extends across said annular space and through said sleeve, a conductor lying in said annular space within said rotated magnetic field and forming at least part of an inertia mass, means resiliently connecting said inertia mass with said magnet and sleeve so that said mass rotates with said magnet and sleeve and is displaced angularly relative to the magnet and sleeve in response to torsional oscillations of the rotated member thereby to cause movement of said conductor relative to the rotated magnetic field for producing electric currents in said conductor characteristic of the torsional oscillations, a hollow cylindrical body surrounding said magnet and carrying said conductor to define said inertia mass with said conductor, bearing rings interposed radially between said cylindrical magnet and body so that said magnet forms a rotational mounting for said body, the device further comprising a collector assembly for transmitting the electric currents from said conductor and including an insulating cap on said cylindrical body, a non-rotatable rod mounted centrally in said cap, annular collecting members concentric with said rod and mounted at opposite sides of said cap and insulated from each other by the latter, said annular collecting members being electrically connected to the opposite ends, respectively, of said conductor, and spring elements mounted on said rod and bearing in opposed axial directions against said annular collecting members to resiliently maintain intimate contact with the latter, said spring elements serving as brushes for picking-up electric currents from said collecting members.

References Cited in the file of this patent

UNITED STATES PATENTS

| | | |
|---|---|---|
| 2,363,611 | Newell | Nov. 28, 1944 |
| 2,396,540 | Stansfield | Mar. 12, 1946 |
| 2,469,417 | Stein | May 10, 1949 |

FOREIGN PATENTS

| | | |
|---|---|---|
| 423,706 | Great Britain | Feb. 6, 1935 |
| 576,275 | Great Britain | Mar. 27, 1946 |